US010709070B1

(12) United States Patent
Wilkins (10) Patent No.: US 10,709,070 B1
(45) Date of Patent: Jul. 14, 2020

(54) APPARATUS FOR SEPARATING PLANT FLOWER FROM STALK AND METHOD OF SEPARATING FLOWER FROM STALK

(71) Applicant: HEMP COMPANY LLC, Bristol, TN (US)

(72) Inventor: Randall Hughes Wilkins, Wilmington, NC (US)

( * ) Notice: Subject to any disclaimer, the term of this patent is extended or adjusted under 35 U.S.C. 154(b) by 0 days.

(21) Appl. No.: 16/734,962

(22) Filed: Jan. 6, 2020

Related U.S. Application Data

(60) Provisional application No. 62/844,267, filed on May 7, 2019.

(51) Int. Cl.
*A01G 3/00* (2006.01)
*A01D 45/00* (2018.01)
*A23N 15/02* (2006.01)

(52) U.S. Cl.
CPC .............. *A01G 3/00* (2013.01); *A01D 45/00* (2013.01); *A01G 2003/005* (2013.01); *A23N 15/02* (2013.01)

(58) Field of Classification Search
CPC .. A23N 15/02; A23N 15/01; A01D 45/00–30; A01D 46/02; A01D 63/02; A01G 3/00; A01G 2003/005; A01G 17/026
USPC ........................................ 460/134, 135, 140
See application file for complete search history.

(56) References Cited

U.S. PATENT DOCUMENTS

| | | | | |
|---|---|---|---|---|
| 2,336,280 A | * | 12/1943 | Miller ................... | A01D 46/02 460/125 |
| 2,376,120 A | | 5/1945 | Campbell et al. | |
| RE22,889 E | * | 6/1947 | Dauenhauer .......... | A01D 46/02 460/126 |
| 2,428,321 A | * | 9/1947 | Rivard ................... | A01D 46/02 460/128 |
| 2,447,122 A | | 8/1948 | Horst, Jr. | |
| 2,536,927 A | * | 1/1951 | Griswold ............... | A01D 46/02 460/126 |
| 2,592,833 A | * | 4/1952 | Swanson ................ | A01G 5/00 47/1.01 R |
| 2,611,215 A | * | 9/1952 | Johnson ................. | A01G 3/00 47/1.01 R |
| 2,645,893 A | * | 7/1953 | Horst, Jr. .............. | A01D 46/02 56/126 |

(Continued)

*Primary Examiner* — Alicia Torres
*Assistant Examiner* — Adam J Behrens
(74) *Attorney, Agent, or Firm* — Dinsmore & Shohl LLP; Monika L'Orsa Jaensson, Esq.

(57) ABSTRACT

An apparatus and method for separating plant flowers from stalks by means of a lateral rotating tube having a plurality of flexible, elongated members affixed to and extending radially outward from the tube. The apparatus may include a platform and a frame supporting the tube above the platform to accommodate plants held between the platform and the tube so that when the tube is rotating, the elongated members affixed thereto brush against the plants and cause the flowers to brush off at and separate from the stalks. The frame further supports a housing to form a contained space, including a back wall, side walls and a hood to direct the flow of flowers after separation from the stalks. The hood extends above and over the tube, having a front wall extending about or below a central axis of the tube. A power system provides rotational power to the tube.

16 Claims, 9 Drawing Sheets

(56) References Cited

U.S. PATENT DOCUMENTS

| | | | | |
|---|---|---|---|---|
| 2,853,845 A | * | 9/1958 | Smith | A01D 45/30 |
| | | | | 56/128 |
| 3,927,680 A | * | 12/1975 | Stefan | A01D 46/02 |
| | | | | 460/128 |
| 4,288,888 A | | 9/1981 | Herolzer | |
| 4,330,903 A | | 5/1982 | Vilotti | |
| 4,373,322 A | * | 2/1983 | Beisel | A01D 45/30 |
| | | | | 56/126 |
| 4,761,942 A | * | 8/1988 | Williames | A01D 46/00 |
| | | | | 56/13.1 |
| 5,323,594 A | * | 6/1994 | Whitney | A01D 45/30 |
| | | | | 56/126 |
| 5,501,067 A | * | 3/1996 | Brown | A01D 45/00 |
| | | | | 56/121.4 |
| 5,944,595 A | | 8/1999 | Prothro | |
| 10,448,578 B2 | | 10/2019 | Lyons et al. | |
| 2014/0250852 A1 | | 9/2014 | Palm | |

* cited by examiner

APPARATUS FOR SEPARATING PLANT FLOWER FROM STALK AND METHOD OF SEPARATING FLOWER FROM STALK

BACKGROUND

The disclosed technology generally relates to an apparatus for separating harvested plant flower from its stalk, including hemp, hop and other flowering plants, and further relates to a method for separating plant flower from stalk.

Certain uses of hemp, hop and other flowering plants requires the separation of the flower or bud from the stalks or stems of the plant, which can be time consuming and expensive. Traditionally, flower is separated from the stalks by hand, which is labor intensive, or is cut from the stalk, which leaves a portion of the stem with the separated flower. Further, current mechanized processes can be costly or lead to poor separation, with the inclusion of a high percentage of stalk remaining with the flower. As such, there is a need for a new and improved apparatus which is more efficient, inexpensive to produce and use, and which can effectively and gently separate flower from plant stalks.

GENERAL DESCRIPTION

The disclosed technology presents an inexpensive, highly efficient and effective apparatus for gently separating plant flower from stalk. Similarly, the disclosed technology presents a novel method for separating plant flower from stalk. Other aspects, features, and advantages of the disclosed technology will become apparent with following disclosure.

Generally, the apparatus of the disclosed technology includes one or more lateral, rotatable tubes having a plurality of flexible, elongated members secured about and extending radially from the wall of the tube. For purposes of this disclosure, 'lateral' means that the axis of rotation of the rotatable tube(s) is(are) positioned parallel with the ground surface. A frame is provided to support the tube(s), and includes a housing positioned about the tube(s) to capture flower as it is separated from stalk. The tube(s) is(are) rotated by means of a motor or other power source, and with such rotation the elongated members gently brush against the plant and thereby remove flower from the stalk of plants positioned within the apparatus.

The apparatus may further include a platform, positioned below the tube and supported by the frame, upon which the plants may be guided and/or supported during the separation process, and capturing some of the flower as it is separated from the stalk.

The disclosed technology further includes a method for removing flower from stalk, using a plurality of flexible, elongated members secured about and extending from the wall of a rotatable tube, wherein harvested plants are positioned near the tube such that as the members rotate, the end portions thereof contact the plant, gently brushing off the flowers from the stalk.

DRAWINGS

Further features and advantages are apparent from the following detailed description, taken in combination with the attached figures, in which.

DETAILED DESCRIPTION

As shown in the embodiments depicted in FIGS. 1-7 and 9, the disclosed technology regards an apparatus for gently and efficiently separating plant flowers from stalks, the apparatus including one or more rotatable, lateral tubes 3 having a plurality of elongated members 4 extending radially from the outer surface of the tube. A feed table or platform 2 may be positioned below the tube to support plants during the separation process, capturing and directing the flow of flower out of the apparatus. A power system 5 is coupled with the apparatus to provide rotational movement to the tube(s). Further, a frame 1 supports the platform 2, if any, and the tube(s) 3, and may further support the power system 5.

The frame 1 and platform 2 may be made of metal, wood, plastics, composites, or any other suitable material. The tube 3 can also be made of metal, wood, plastics, composites, or any other suitable material, although an embodiment would have the tube be made of PVC or a similarly suitable material through which holes may be easily drilled for purposes of supporting the elongated members.

Figure 7:
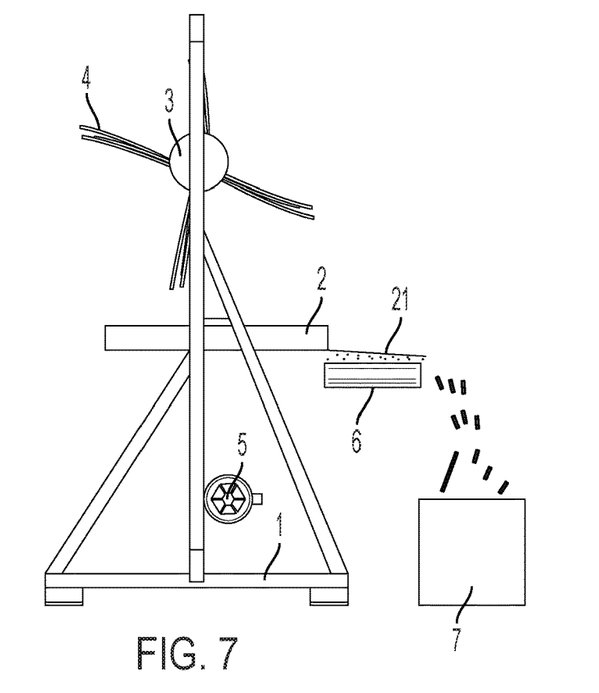
FIG. 7 is a side view of another embodiment of the apparatus of the disclosed technology, with the hood removed to show the internal mechanisms of the apparatus, wherein the apparatus includes a conveyor system, an extension ramp and a container.
Figure 8A:
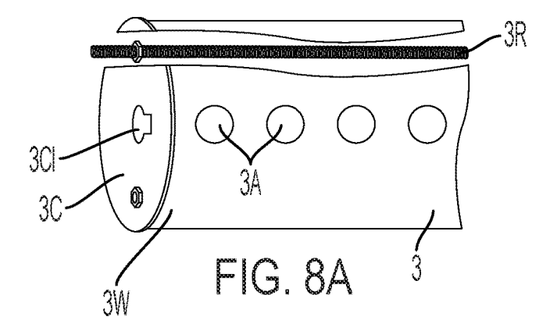
FIG. 8A shows a portion of an embodiment of the tube of the apparatus of the disclosed technology.
Figure 8B:
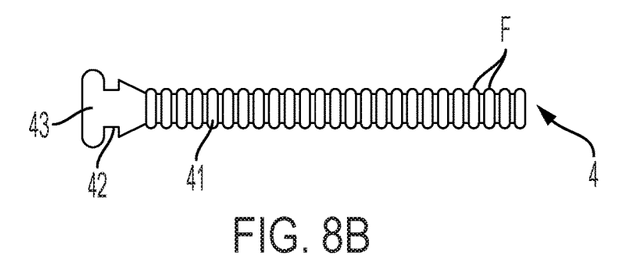
FIG. 8B shows an embodiment of an elongated member of the apparatus of the disclosed technology.
Figure 8C:
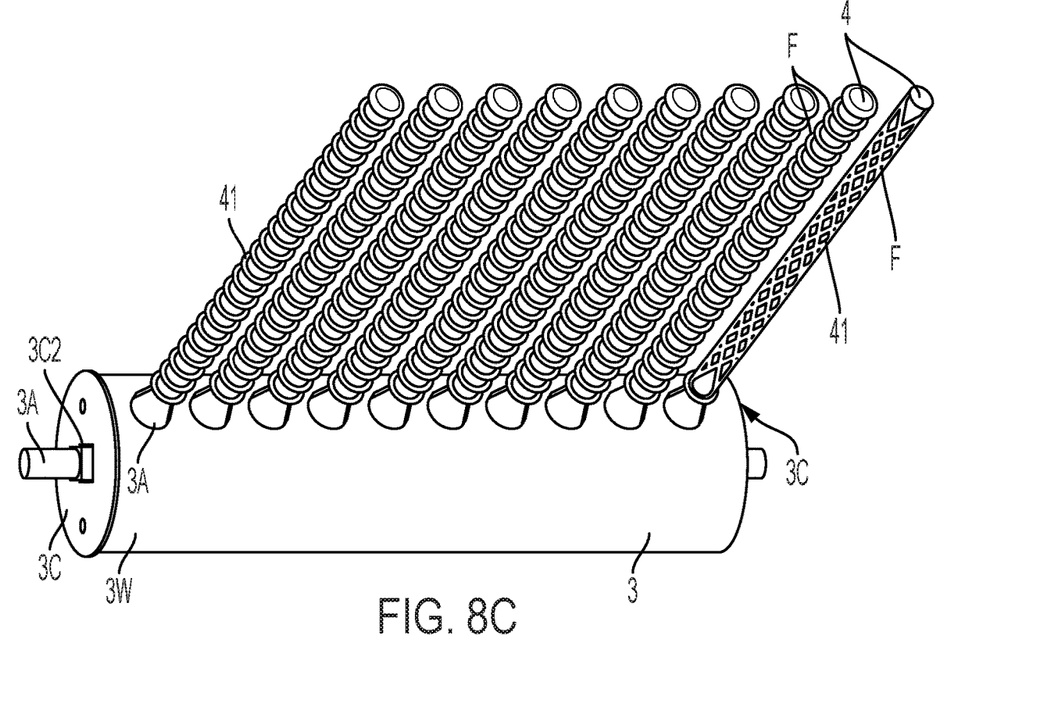
FIG. 8C shows an embodiment of the tube of the disclosed technology, with a row of elongated members.

Referring specifically to FIGS. 8A and 8C, the lateral tube 3 may be defined by a cylindrical wall 3W affixed to an axle 3A. As shown in FIGS. 1-3, 5-7, 8C and 9, the elongated members 4 are affixed to and extend radially from this cylindrical wall. The cylindrical wall and the axle may be constructed as a single unit, or as two distinct yet coupled elements. Suitable tubes include 6" diameter, 6' long PVC pipe. The axle may be a 1" diameter steel shaft, with an 82" length. The diameter and length of the axle may differ for differently sized tubes.

In an exemplary embodiment, such as that shown in FIGS. 8A and 8C, the tube 3 may be affixed to the axle 3A by means of a pair of end caps 3C secured at or near each end of the tube. In this embodiment, each cap has a central aperture 3C1 profiled to engagingly receive the axle, the axle having a protrusion 3C2 along at least a portion of its length to engage with the central aperture of at least one of the caps. The caps may be made from aluminum or other suitable materials, and may be larger in circumference than the tube, with a honed channel on the interior surface sized and shaped to tightly receive an end of the tube 3. To further secure the caps to the tube, one or more all-thread rods 3R may be positioned within and along the length of the tube, securing the caps at each end thereof through additional apertures accommodating the all-thread rods, and inhibiting rotation of the axle independent of the tube. Hex nuts may be threaded to the rod on the exterior of the cap, and nylon locknuts may be threaded on the interior side of the cap. Suitable all-thread rods are longer than the tubing, such as for example 6'4" long for 6' tubing, so that the ends thereof may be secured with the nuts.

As shown in FIGS. 8A and 8C, the cylindrical wall of the tube includes a plurality of apertures 3A, each aperture being sized to receive and secure an end of a flexible, elongated members. Referring now to FIGS. 8B and 8C, the elongated members may include a shaft 41, a collar 42, a base head 43, and at least one raised facial surface F. The elongated members 4 may be spaced in rows, in alternating positions, or in other patterns, on a tube 3.

Figure 8D:
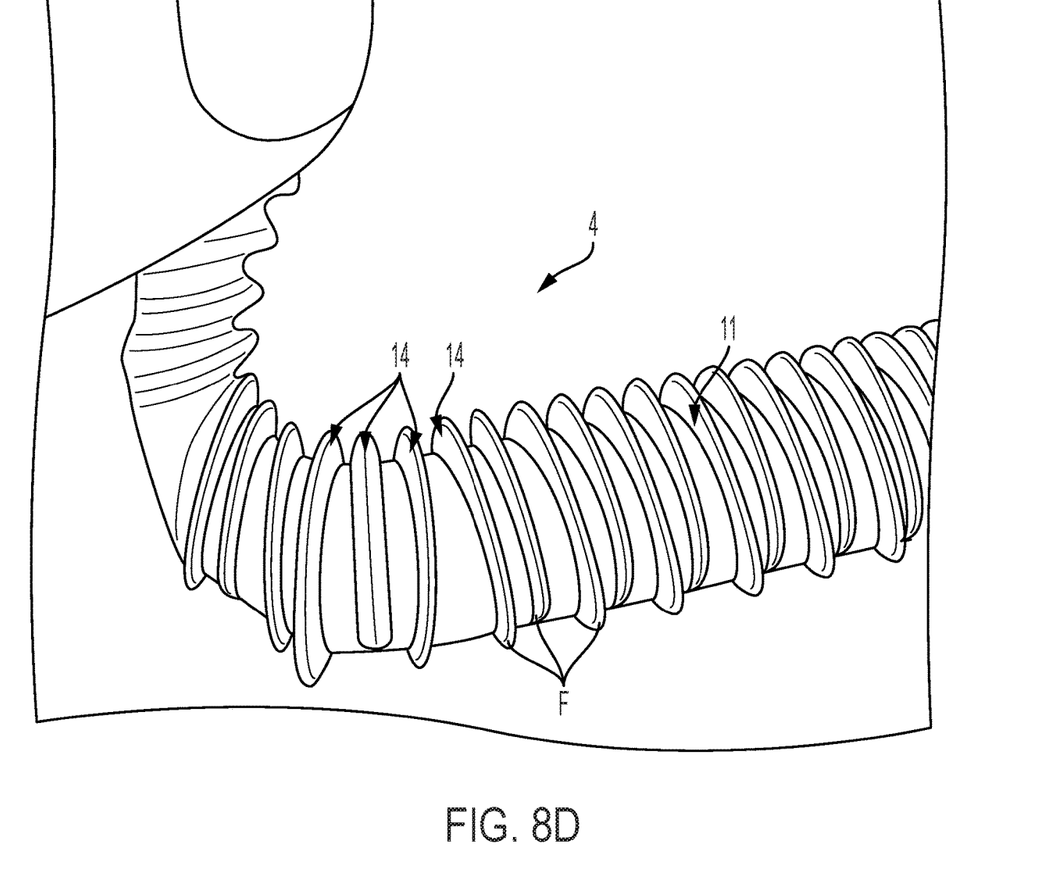
FIG. 8D shows an embodiment of a portion of the elongated members of the apparatus of the disclosed technology, demonstrating the flexibility of the elongated member (in this illustration by means of a finger)
Figure 8E:
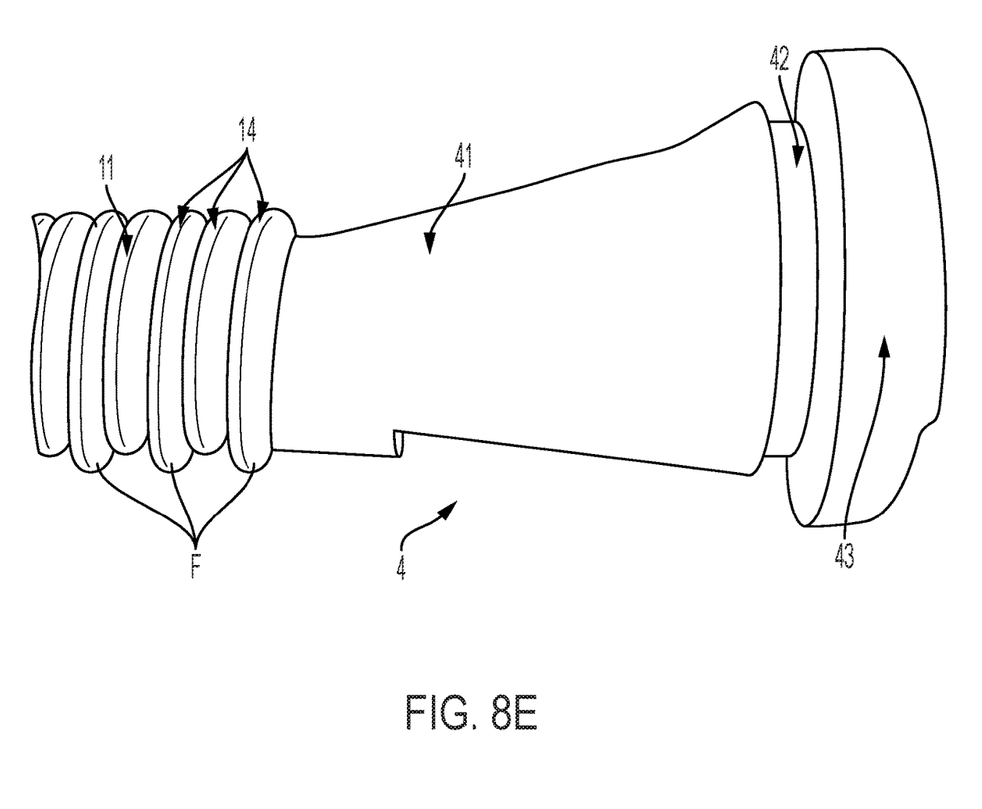
FIG. 8E shows an embodiment of a portion of the elongated member of the disclosed technology.

In many embodiments of the present invention, elongated members 4 are made of a resilient yet flexible material, including rubber, rubber-like materials, plastics, and composites. Ideally the elongated member bends when it comes in to contact with the plant, as reflected in FIG. 8D, enhancing the brushing effect of the member, and increasing the rate of removal of flower from stalk.

As shown in the Figures, each elongated member is removably secured to the tube at the apertures 3A, in such a manner that the base head 43 would be positioned within the vacuous interior of the tube, the collar 42 positioned at the aperture, and the shaft 41 of the elongated member extending radially outward from the tube wall 3W. In this configuration, the circumference of the collar is slightly smaller than the circumference of the corresponding aperture 3A in the tube wall, and the circumference of the base head is greater than the aperture, so that the base head is secured behind the aperture, in the interior of the tube. Likewise, the circumference of the upper end of the shaft is greater than the circumference of the aperture, to secure the elongated member to the tube, particularly as it is rotating in operation. This upper end of the shaft should be made from a flexible material to allow it to deform while passing through the aperture, and regain its shape when the shaft is positioned wholly outside of the tube wall. The depth of the collar may be about the same as the thickness of the tube wall, to inhibit significant rotation and movement of the installed member within the aperture. For ease of installation of the elongated members and maintenance of the apparatus, the circumference of the remaining length of the shaft 41 is less than the circumference of the aperture 3A of the tube, so that most of the shaft may pass through the aperture without deformation. Exemplary diameters of the shaft range between ½" to ⅜"; larger diameter shafts may more efficiently deflower drier or more fibrous plants.

In operation, the raised facial surface F of the elongated members brushes against the plant to cause the flower to separate from the stalk. The raised facial surface of the elongated member may include surface textures such as waffles, cross hatches, or other designs or patterns. In some embodiments, such as depicted in FIGS. 8A-E, at least part of the raised facial surface of the elongated member includes a series of perpendicular rows so that when the elongated member bends as it comes into contact with the plant, the rows pinch the flower and the stalk, thereby increasing the rate and efficiency of separation. In some embodiments the distance between these perpendicular rows decreases at a point of bending, such as at 3-4" from the end of a 10-11" shaft (acknowledging that the point of bending can vary depending on the length of the shaft).

The elongated members are made of a resilient yet flexible material, such as rubber, rubber-like materials, plastics, and composites, and combinations thereof. In other embodiments of the disclosed technology, the tapered shaft 41 of the elongated member may also include more rigid materials, such as metal or wire, which may increase efficiency of the apparatus when the plant is "green" or "undried", having a higher moisture content as hereinafter described. Poultry fingers, such as 10" picking fingers from Kent Company, or those provided in U.S. Pat. No. 3108317, are particularly suited to be used as elongated members of the disclosed technology. The shaft of the elongated members may be 4"-12" long, or longer.

After harvest, the plants begin to lose moisture; overnight they regain some of this moisture. For example, at harvest a hemp plant may have 17% or more moisture; during the day this may decrease to 8-12%, regaining some of this moisture overnight depending on the moisture in the air. Over several days, the plant may decrease to 5% moisture or lower. Your inventors have found that shorter elongated members (e.g., 5"-7") are more efficient in removing flower from hemp plants with higher moisture (16% or more). Your inventors have also found that increasing the rotational speed of the tube more efficiently removes flower from hemp plants with this higher moisture content.

Figure 9:
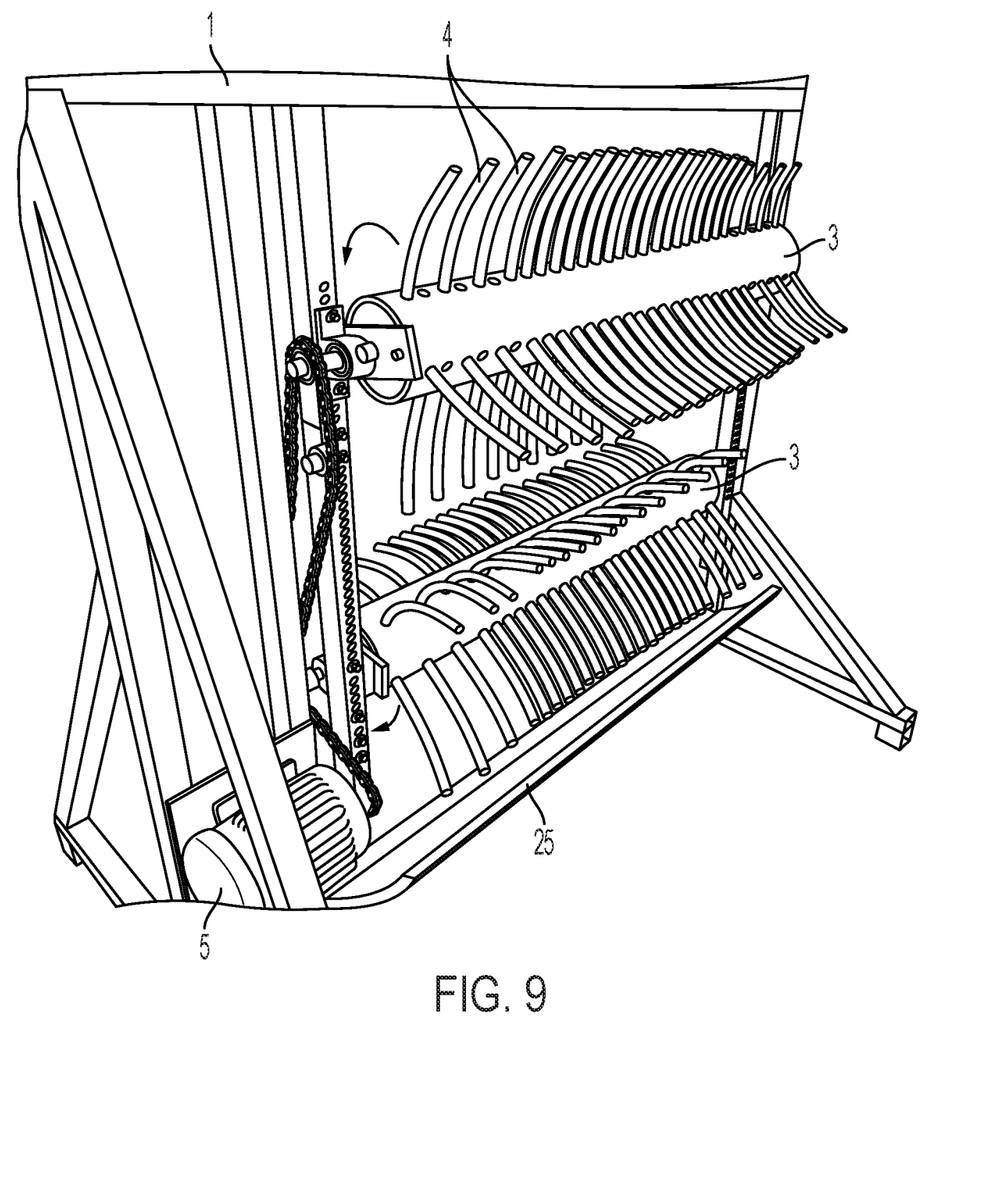
FIG. 9 shows another embodiment of the apparatus of the disclosed technology, with two tubes positioned on the frame, with the housing removed.

In some embodiments, such as shown in FIG. 9, the apparatus includes a pair of rotating tubes 3 with elongated members in the configuration hereinabove described, the tubes being positioned one above the other within the housing. In such a configuration, the platform may be eliminated. In these embodiments, the plants are inserted between the rotating tubes, and the flowers are removed therefrom without having to rotate the plants within the apparatus. Further, the back of the housing may extend below both of the rotating tubes to contain flower within the housing. Similarly, a front housing panel 25 may also be provided in these dual tube embodiments, extending from the axle of the lower tube to about a foot below the ends of the elongated members affixed to the tube, to capture flower removed from the stalks by the lower rotating tube. As shown in FIG. 9, this additional front housing panel may be curved to facilitate removal of flower from the apparatus and control air flow. Caution should be taken so that when the tubes are rotating simultaneously, the elongated members of one of the tubes do not significantly interfere with the elongated members of the other tube. This can be accomplished by varying the spacing of the elongated members on each tube, or the positioning of the tubes relative to each other, so that the elongated members on each tube generally are positioned within the voids between the elongated members of the other tube when the tubes are rotating on the apparatus.

Figure 1:
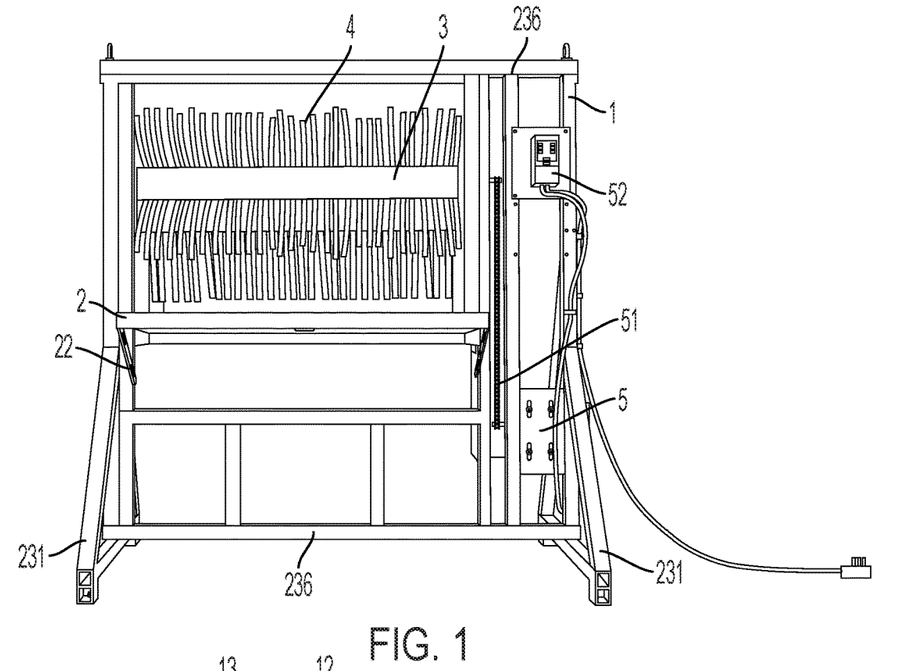
FIG. 1 is a front view of an embodiment of the apparatus of the disclosed technology, with the hood of the housing removed to show the internal mechanisms of the apparatus.
Figure 2:
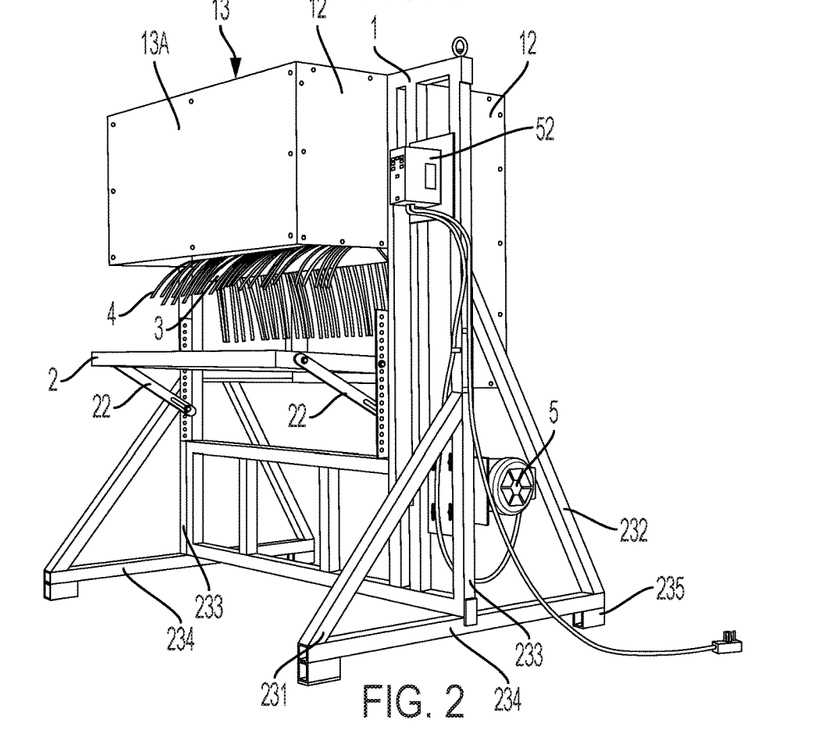
FIG. 2 is a peripheral view of an embodiment of the apparatus of the disclosed technology, showing in particular the front of the apparatus.

Rotation of the tube or tubes 3 is provided and controlled by a power system 5, such as a motor. As shown in FIGS. 1 and 9, the power system may have a chain or belt drive 51 which leads from the motor to the tube's axle 3A, allowing the motor to be positioned lower on the frame. In some embodiments, the power system may also include a variable frequency drive coupled with the motor, with a user interface 52 allowing the user to select from variable speeds of rotation for the tube(s). Decreasing the speed of the tube can efficiently remove flower from dried plants, and increasing the speed of the tube allows for greater separation of flower from plants having a higher level of moisture. Rotational speed may range from 8-20 Hz, although higher or lower speeds may be used based upon the humidity and fibrous nature of the plant. The rotation of the tube may be clockwise, or counterclockwise; clockwise rotation will cause the flower after separation to be captured within the back of the housing as hereinafter described. In a dual tube apparatus, one tube may rotate clockwise (for example, the upper tube), while the other tube rotates counter clockwise, thereby controlling flow of flower in the apparatus. Exemplary motors include a 220 Volt, 3 phase, 2-horsepower motor with a 220 single phase variable frequency drive; or a 100/115 Volt motor with a horsepower between ½ and 2, and a direct current (DC) motor speed control.

As hereinabove discussed and shown in the Figures, the apparatus may include a frame 1 to support the tube 3 (specifically, the tube axle 3A, in a manner to allow the rotation of the same) above the platform 2, if any; or to support two tubes in like manner, such as shown in FIG. 9. In some embodiments, the frame generally is a modified sawhorse, comprising two front legs 231 and two back legs 232 extending angularly or semi-angularly from a pair of primary vertical shafts 233, with the back legs attached to the vertical shaft at a position above the attachment position of the front leg to the vertical shaft. The lower end of the legs forming the sides of the frame are affixed to one of at least a pair of horizontal support structures 234. In some embodiments, the horizontal support structures are lifted off the ground by means of feet 235, positioned at each bottom corner of the frame. In addition or alternatively, the horizontal support structures may be lifted off the ground by means of one or more casters, or height adjustable casters, allowing the height of the frame to be adjusted relative to a user, and further facilitating the transportation of the apparatus. Affixed to and between the vertical shafts are one or more cross bars 236, extending the width of the sawhorse. Other support bars between the sides of the frame and otherwise may be provided to support the frame, the tube(s), the platform, the power system and its components, and/or other apparatus components.

In some embodiments the platform 2 is supported by the frame 1 an adjustable distance below the tube 3, adjusting to accommodate plants held between the platform and the tube so that when the tube is rotating, the elongated members affixed thereto brush against the plants positioned against the platform, and cause the flowers to brush off the stalks. The position of the platform relative to the tube may be adjusted by means of one or more hinge bars 22, facilitating vertical, horizontal and/or rotational adjustment of the platform, and in any of the resulting positions may be described as being within one of many possible planes. The hinge bars may be made from ¼" steel, movably secured to the frame and the platform by means of bolts and washers secured within circular or elongated apertures on the bars. Alternatively or in addition, the tube may be movably positioned on the frame, allowing vertical adjustment thereof. Adjusting the space between the tube and the platform creates a larger opening for use with larger plants, or a smaller opening to use with smaller plants. Adjusting the angle of the platform so that it has a slope descending towards the back of the apparatus assists in directing the flower after it has been separated from the stalks of the plant. In some positions the distance between the end of the elongated members as they rotate with the tube and the platform may be between about 10-14", or about 12", depending on the size of the plants.

Figure 5:
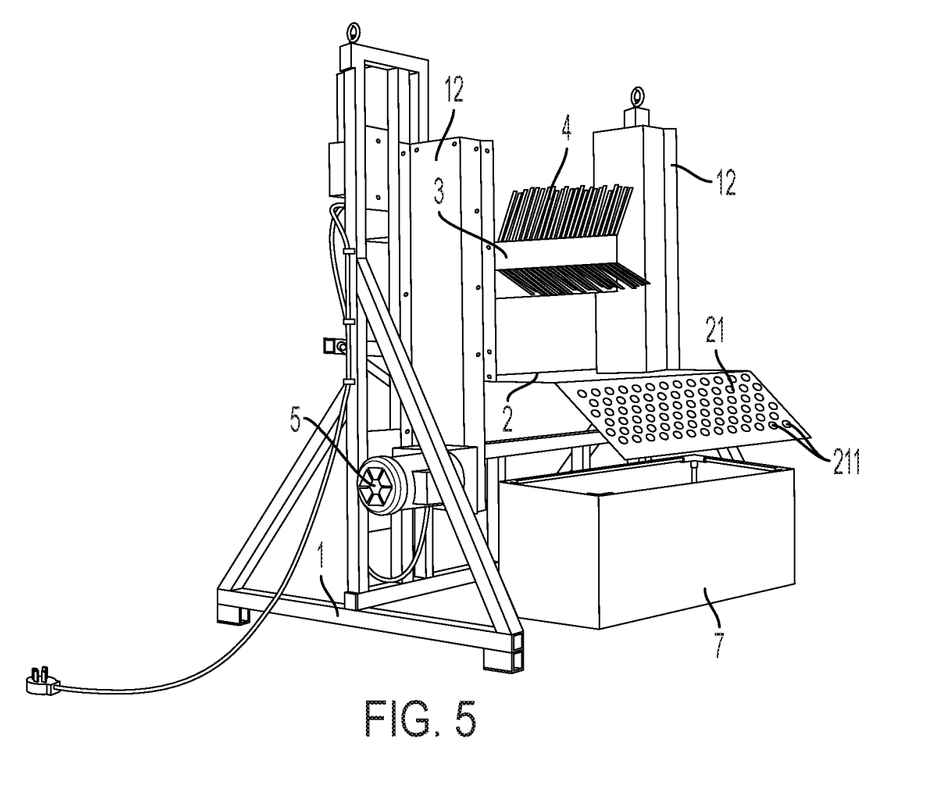
FIG. 5 is a peripheral view of another embodiment of the apparatus of the disclosed technology, with the hood removed to show the internal mechanisms of the apparatus, wherein the apparatus includes an extension ramp and a container.
Figure 6:
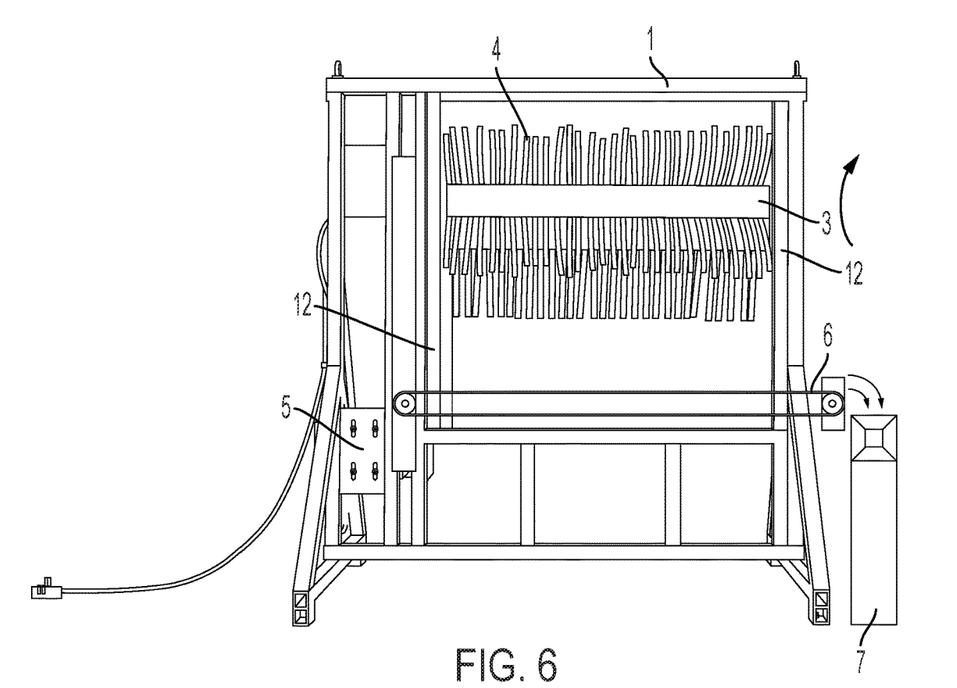
FIG. 6 is a back view of another embodiment of the apparatus of the disclosed technology, with the hood removed to show the internal mechanisms of the apparatus, wherein the apparatus includes a conveyor system to remove separated flower from the apparatus.

In some embodiments, such as the embodiments depicted in FIGS. 5-7, an extension ramp 21 is angularly affixed to the back end of the platform, positioned at a negative angle of about 20-30 degrees relative to the plane of the platform. A portion of the extension ramp may include a plurality of apertures 211, sized to allow flowers to fall through the apertures as the flowers and stems traverse the ramp. The apertures may be between about 1.5"-3" in diameter, or 2" in diameter. The apertures may be round or diamond shaped, or otherwise shaped to allow flowers to pass therethrough.

Figure 3:
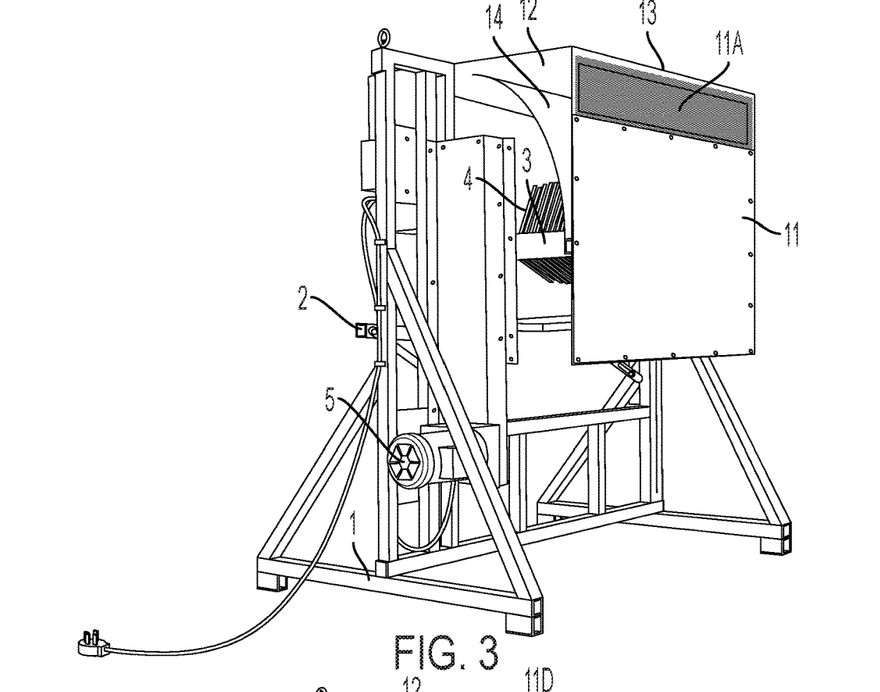
FIG. 3 is another peripheral view of the embodiment of FIG. 2, showing in particular the rear of the apparatus with the side wall removed.

The frame 1 further supports a housing about the tube, including a back wall 11, opposing side walls 12 and a hood 13 to contain and direct the flow of flowers after separation from the stalks. The back wall 11 is positioned a distance away from the platform to allow separated flower and stalk to be eliminated from the apparatus through the gap between the back wall and the platform. In the embodiments shown, the back wall extends below the lowest position the platform may assume by adjustment, to direct the flow of flower from the apparatus regardless of the platform position. In some embodiments, such as shown in FIG. 3, an open chute extends from the back of the apparatus and further directs the flow of flowers from the apparatus. When a 6" tube is used, the distance from the center of the drum to the back wall may be between 16-24", or 18 ¼", leaving sufficient space for the elongated members to rotate within the housing and flower to traverse the same, without crushing the flower.

The hood 13 of the housing extends from the back wall 11 to the front of the apparatus, with a front wall 13A forming the front of the hood and extending to about or below the axle of the tube. In an embodiment, the front wall extends about 1" below the axle of the tube.

Further, as the elongated members rotate quickly with the tube, air pressure increases about the elongated members. Therefore, a curved air shield 14 may be positioned within the hood to focus this air flow within the housing and direct the flow of flowers to the housing area behind the tube. As shown in FIG. 3, this air shield may extend from the middle of the hood (aligned with the axle of the tube) to the back wall, leaving about a 3-5" gap between the air shield and the back wall. In an embodiment, the first end of the air shield may be affixed to the hood using bolts or other affixation means, and the second end may be affixed to the back wall by means of square tubing. The air shield may be positioned so that when the tube is rotating, there is a gap between the ends of the elongated members and the air shield of between about 2-6" or more, or in some embodiments 2W.

A removable liner may be secured within the hood or air shield to capture airborne particles, including plant terpenes, essential oils and flavonoids, which may be released during the separation process of the disclosed technology. The liner may be made out of a material such as coffee filter paper or cotton fabric, allowing the captured oil and particles to be extracted therefrom as a saleable product, such as by means of carbon dioxide or ethanol extraction.

To further control air flow within the housing and reduce air pressure at the surface of the platform, an air vent 11A comprising a grid screen may be positioned at the top of, and extend the width of, the back wall 11, as shown in FIG. 3. In some embodiments, this grid screen may have a depth of between about 5" to 7". This air vent draws air from the platform, neutralizing the air flow generated by the rotating elongated members at the platform.

Figure 4:
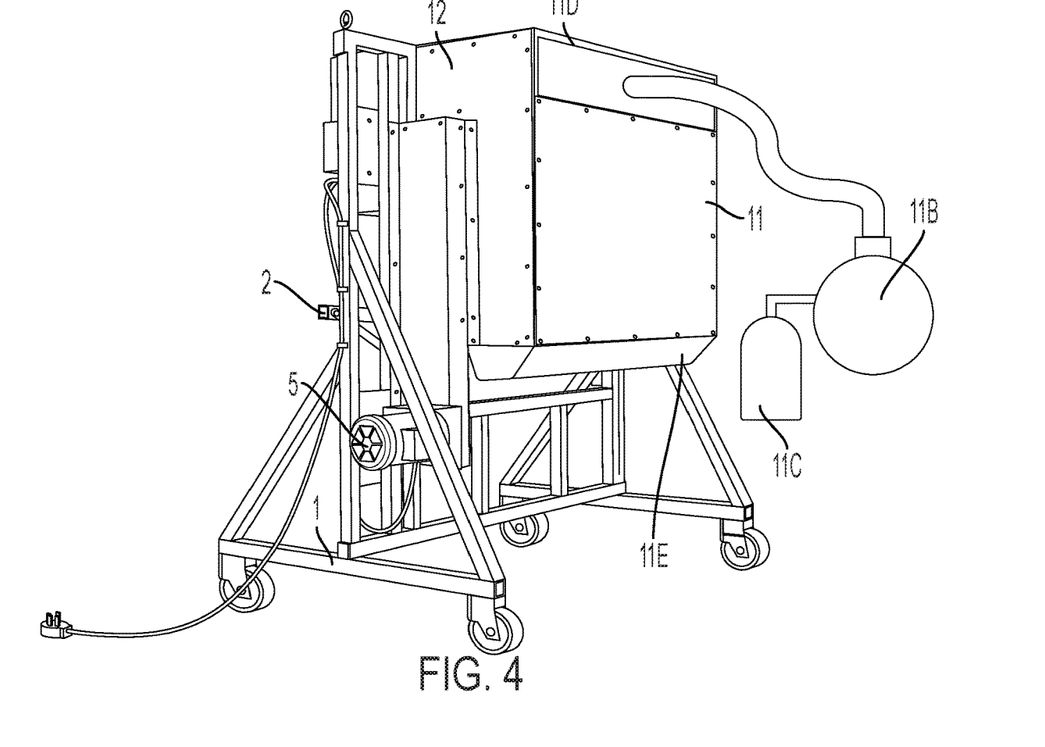
FIG. 4 is a peripheral view of another embodiment of the apparatus of the disclosed technology, showing in particular the rear of the apparatus, with a vacuum system installed.

As shown in the embodiment of FIG. 4, a vacuum 11B may also be incorporated with an enclosure 11D along the upper end of the back wall. The vacuum suctions flower from the enclosure and the contained space of the housing, delivering the flower and airborne particles into a container 11C. In some embodiments, the vacuum is a cyclone filtration vacuum, gently gathering flower and valuable airborne particles, including plant terpenes, essential oils and flavonoids, from the apparatus. The enclosure 11D may have an internal design to encourage the flower to the vacuum, such as a v-shaped channel. The container may be or include a bag lined with coffee filter paper or cotton material, or other lined or unlined repository structure, to capture oil and particles.

As shown in FIG. 6, the apparatus may include a conveyor belt system 6 below the back of the hooded area (or below a chute incorporated into the back of the apparatus, as hereinafter described), to which the flower will fall, conveying the flower out of the area into a container. When an extension ramp 21 is included with the apparatus, a conveyor belt may be positioned beneath the aperture portion of the extension ramp, to receive and transport flower from the apparatus (as shown, for example, in FIG. 7). Use of a conveyor also facilitates the removal of any stalks remaining with the flower from the flat surface of the conveyor, wherein by such a configuration the stalk is more visible and can be easily removed before it is received in the container.

In some embodiments, as shown in FIG. 4, the back of the housing further comprises a chute 11E, partially enclosing the back bottom of the housing and directing the flower to a conveyor or container.

As shown in FIGS. 5-7, the apparatus may further include one or more containers 7 to collect flower, stalk, or both. One of the containers may be positioned, for example, at the end of the extension ramp 21, to receive stalks (and possibly flower) traversing the ramp. A container may likewise be positioned below the extension ramp, to receive flowers falling through the apertures 211 of the extension ramp. A container may also be positioned at the end of the conveyor belt to collect flower delivered thereby. Containers suitable for use with the disclosed technology may include a simple frame with a removable liner made of, for example, coffee filter paper or cotton fabric.

In operation, the motor supplies rotational energy to the tube 3. When the tube is rotating at a rapid rate (e.g., 8-20 Hz), the elongated members gently brush flowers from plants held between the platform 2 and the tube 3, and by means of the air flow controlled within the housing, the flower is delivered to the back of the housing where it falls to a container, conveyor or otherwise out of the apparatus (or, in some embodiments, may be vacuumed out as hereinabove described). The user may rotate the plants within the opening to expose other areas of the plant to the elongated members, thereby deflowering the entire harvested plant. When two tubes are used, the motor (or a pair of motors) supplies rotational energy to each tube, which rotate at the same rate, and plants are held for deflowering between the rotating tubes.

Figure 10:
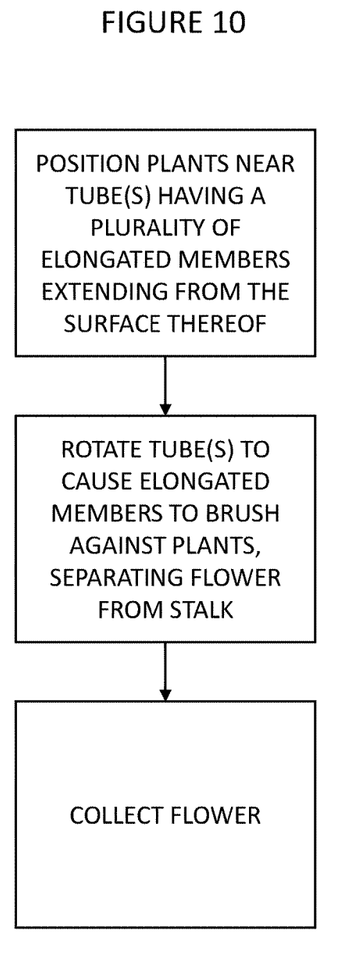
FIG. 10 is a flowchart of the method of the disclosed technology.

As shown in FIG. 10, the disclosed technology further provides a method for separating plant flower from stalk. In this method, plants are positioned near one or more lateral rotating tube, the tube(s) having a plurality of flexible, elongated members affixed to and extending radially outward from the tube, such as the apparatus hereinabove described generally and through embodiments. The tube(s) is(are) rotated, causing the elongated members to brush against the plants, thereby separating the flower from the stalk. Separated flower is then collected for sale or further processing.

In an embodiment of this method, the tube includes a cylindrical wall affixed to an axle, with a plurality of apertures extending through the cylindrical wall to receive and secure an end of each of the flexible, elongated members. The elongated members may include a tapered shaft, a collar, a base head, and at least one raised facial surface, such that in operation the raised facial surface brushes against the plant to cause the flower to separate from the stalk. Each of the apertures in the cylindrical wall may be sized to removably secure one of the elongated members to the tube, at the collar of the elongated member, so that the base head of the elongated member extends into a vacuous interior of the tube, and the tapered shaft of the elongated member extends outwardly from an outer surface of the tube.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present application or of any further application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an " and "the" mean "one or more", unless expressly specified otherwise.

A description of an embodiment with several components in communication with each other does not imply that all such components are required. On the contrary a variety of optional components are described to illustrate the wide variety of possible embodiments of the disclosed technology.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The invention claimed is:

1. A method for separating plant flower from stalk, the method comprising
   positioning plants on a platform near a lateral rotating tube, the tube having a plurality of flexible, elongated members affixed to and extending radially outward from the tube,
   rotating the tube to cause the elongated members to brush against the plants, thereby separating the flower from the stalk, and
   collecting the flower,
   wherein each of the elongated members affixed to and extending radially outward from the tube comprises a tapered shaft, a collar, a base head, and at least one raised facial surface, such that in operation the raised facial surface brushes against the plants to cause the flower to separate from the stalk, and
   wherein the tube comprises a cylindrical wall affixed to an axle and wherein the cylindrical wall of the tube comprises a plurality of apertures, and wherein each of the tube apertures is sized to receive and removably secure one of the elongated members to the tube, at the collar of the elongated member, so that the base head of the elongated member extends into a vacuous interior of the tube, and the tapered shaft of the elongated member extends outwardly from an outer surface of the tube.

2. The method of claim 1, wherein the tube is supported above the platform by a frame.

3. The method of claim 2, wherein the frame further supports a housing to form a contained space, the housing comprising a back wall, side walls and a hood to direct a flow of flowers after separation from the stalks, the hood extending above and over the tube and having a front wall extending to at least a central axis of the tube.

4. The method of claim 2, wherein the position of the platform is adjustable relative to the position of the tube.

5. The method of claim 3, wherein the back wall is positioned a distance away from the platform.

6. The method of claim 3, wherein the housing comprises an air vent positioned at the top of the back wall, and extending a width of the back wall.

7. The method of claim 3, wherein the hood comprises a curved air shield to direct the flow of flowers within the contained space.

8. The method of claim 3, wherein the housing further supports a vacuum to draw flower from the contained space.

9. The method of claim 3, with a conveyor belt positioned below the contained space to which the flower will fall, and the method further comprising the step of conveying away the flower.

10. The method of claim 1, wherein an extension ramp is angularly affixed to an end of the platform, and wherein the extension ramp extends from the end of the platform at a negative angle of between 20-30 degrees.

11. The method of claim 10, wherein at least a portion of the extension ramp comprises a plurality of apertures to allow flowers to fall through the apertures as the flowers and stems traverse the ramp.

12. The method of claim 11, wherein the apertures have a diameter of between 1.5"-3".

13. The method of claim 11, wherein a conveyor belt is positioned beneath the aperture portion of the extension ramp, to receive and transport flower falling through the apertures.

14. The method of claim 1, wherein at least part of the raised facial surface of each elongated member comprises perpendicular rows to encourage each elongated member to bend when coming into contact with the plant.

15. The method of claim 1, wherein the elongated members are made of rubber.

16. The method of claim 1, wherein the rotation of the tube is provided by a power system, which power system comprises a variable frequency drive to facilitate variable speeds of rotation for the tube.

* * * * *